Jan. 13, 1959 K. C. ELMORE 2,868,069
FINGERPRINT AND DOCUMENT COPYING DEVICE
Filed Sept. 29, 1954 4 Sheets-Sheet 1
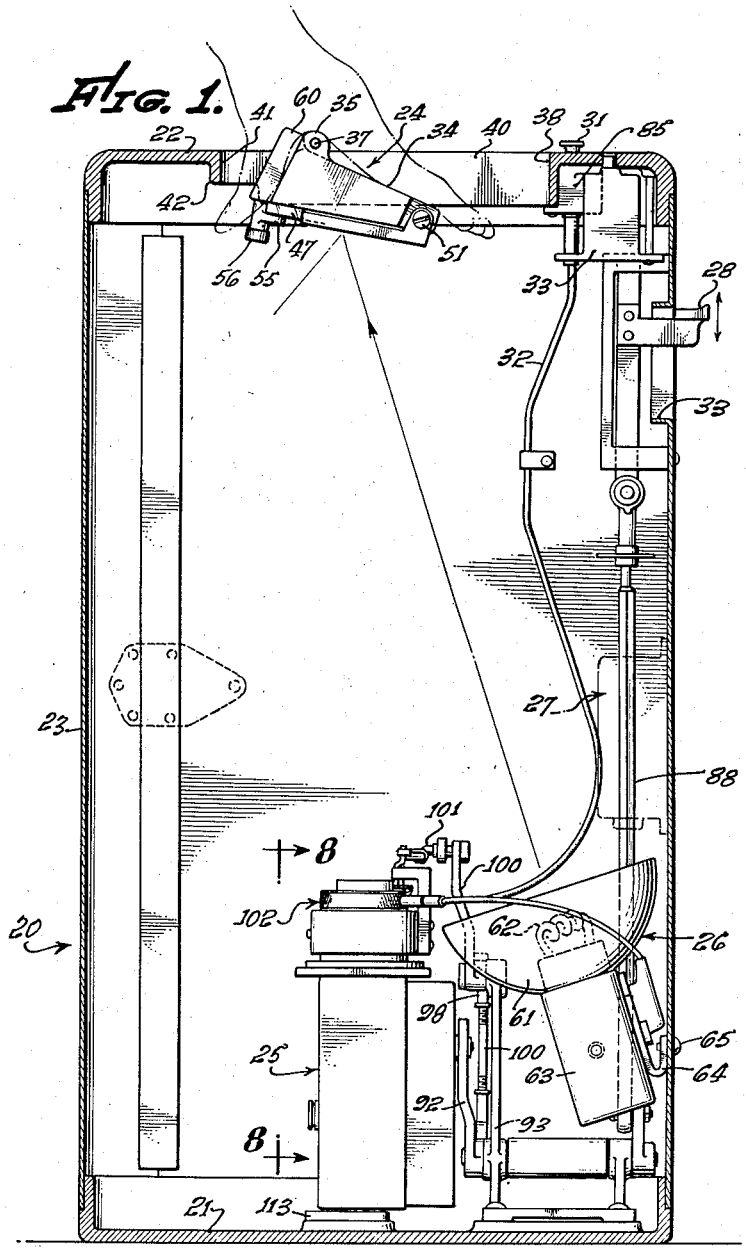
KENNETH C. ELMORE,
Inventor.
BY
ATTORNEY.

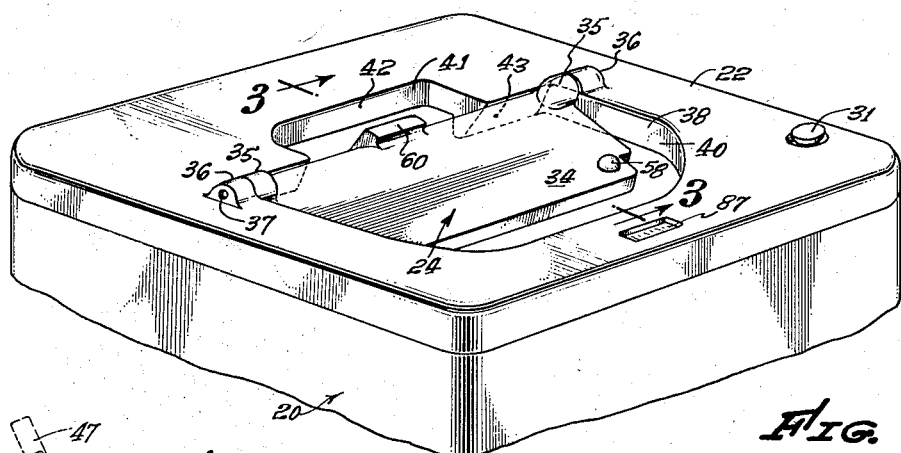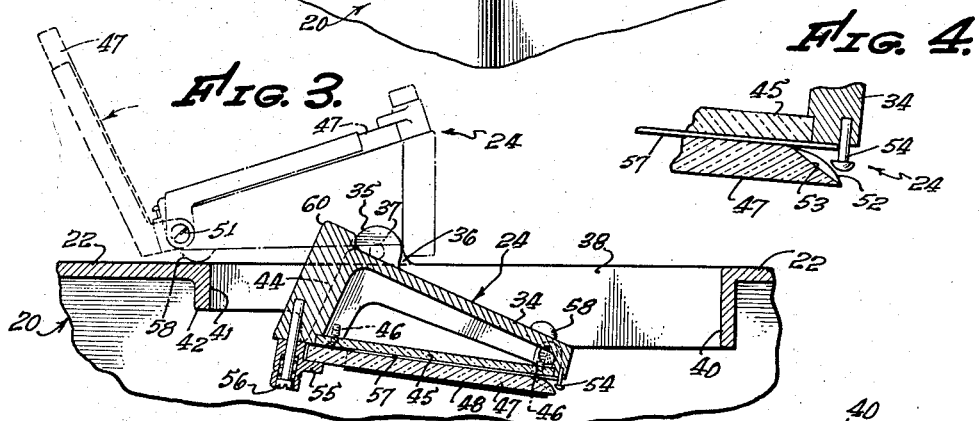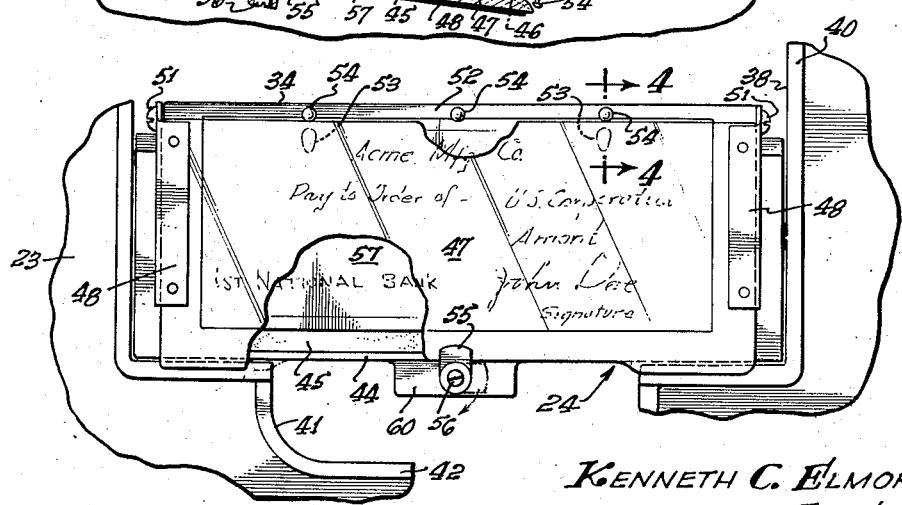

Jan. 13, 1959 K. C. ELMORE 2,868,069
FINGERPRINT AND DOCUMENT COPYING DEVICE
Filed Sept. 29, 1954 4 Sheets-Sheet 3

KENNETH C. ELMORE,
Inventor.
BY
ATTORNEY.

Jan. 13, 1959 K. C. ELMORE 2,868,069
FINGERPRINT AND DOCUMENT COPYING DEVICE
Filed Sept. 29, 1954 4 Sheets-Sheet 4

KENNETH C. ELMORE
Inventor.
BY
Reed C. Lawler
ATTORNEY.

United States Patent Office 2,868,069
Patented Jan. 13, 1959

2,868,069

FINGERPRINT AND DOCUMENT COPYING DEVICE

Kenneth C. Elmore, Arcadia, Calif.

Application September 29, 1954, Serial No. 459,013

4 Claims. (Cl. 88—24)

The present invention relates generally to devices for protecting a negotiator against negotiation of forged or counterfeited documents or documents that are the property of an individual.

It is well known that a substantial volume of business is transacted through the medium of negotiable paper of the familiar bank check variety. The convenience of using checks has enabled substitution thereof for currency as a medium of exchange in many fields of business. Business establishments of all sorts, as well as banks and other financial agencies, are continually being asked to cash checks. This does not present much of a problem in small towns since the residents are usually well known to the local merchants. In larger cities, even long established places of business usually have no personal acquaintanceship with the great number of people whose trade the proprietors wish to encourage, and yet about whose financial background they are completely ignorant. As a result, merchants have suffered substantial losses by the cashing of forged or counterfeit or fraudulently endosed checks. An effort must therefore be made to reduce the amount of such losses, without interfering with the ordinary flow of trade. Such action becomes difficult due to the fact that an individual who operates in a fraudulent manner is often difficult to trace or otherwise identify, and it is unlikely he will revisit establishments he has once defrauded.

Merchants commonly request strangers to show some proof of identity before cashing checks for them, but, in the pressure of business, they may neglect to do so, or may be satisfied with inadequate identification. Some merchants protect themselves by insurance, which adds to the expense of doing business. The cost, in either case, is eventually passed on to the public in the form of higher prices. To prevent such loss, positive means must be used to identify the perpetrator of the fraud, in order to facilitate his apprehension and conviction.

The present invention consists of a device for photographing the check or other document being offered for negotiation, together with a complete set of the fingerprint configurations of the individual so offering it. There have been known in the prior art, devices for recording some identifying data, such as photographing a thumb print of the person, but such devices have not been successful because often a positive identification frequently could not be made from the print of one finger. Additionally, the connection between the fingerprint and the patricular check being negotiated has not heretofore been sufficiently positive to satisfy the tests demanded for legal proof of fraud.

The instant invention is designed simultaneously to provide a permanent photographic record of several facts, which, when connected together, positively relate the document and the individual. Representations of all the fingerprints of the individual presenting the instrument for negotiation, the face of the instrument, and, when necessary, the endorsements on the rear of the check, are photographed together. These items are simultaneously recorded on a single film. This simplifies the problems of proving the identity of the individual presenting the document, connecting such individual with the document, and showing all significant details of the document presented.

The present invention has additional utility in connection with the recording of pertinent data relating to an individual and documents which may be relied upon to identify the individual, such as, for example, birth certificates, drivers' licenses, etc. Individuals have been known to use forged or counterfeit documents for such identification purposes.

The invention thus provides a relatively simple and foolproof device which will supply evidence sufficient to identify, aid in apprehension, and aid in securing the conviction in court of individuals who present illegal documents for payment or other benefit. By employing the device of the present invention, a considerable reduction will be experienced in the number of negotiated illegal documents and financial losses therefrom, due not only to apprehension and conviction of offending individuals, but also to the fact that those who wish to perpetrate frauds will avoid establishments employing the device of the present invention. The savings thus effected by reduction of loss and reduced insurance premiums may thereafter be passed on to the general public in the form of reduced prices.

Accordingly, it is an object of the present invention to provide a novel device for simultaneously photographing a number of facts concerning a document and the individual presenting such document for identification or negotiation.

Another object of the invention is to provide a device for arranging a document together with the distal portions of the thumbs and fingers in substantially the same plane so that they may be photographed simultaneously on the same film.

Another object of the invention is to provide a device for replaceably mounting a document thereon in a position where it may be readily photographed with the distal portions of the fingers on one side thereof and the distal portions of the thumbs on the other side thereof with the fingerprints and thumb prints and the document facing a camera.

With reference to the drawings:

Figure 1 is a vertical sectional view of one embodiment of the invention;

Fig. 2 is a perspective view of the top portion of the device shown in Fig. 1;

Fig. 3 is an enlarged fragmentary view, partially in section, of the top portion of the device, taken substantially as indicated by line 3—3, Fig. 2;

Fig. 4 is further enlarged fragmentary sectional view of a portion of the check-holding means, taken substantially as indicated by line 4—4, Fig. 5;

Fig. 5 is a bottom plan view showing details of construction of the instrument holding means, with instrument in position therein;

Figure 8:
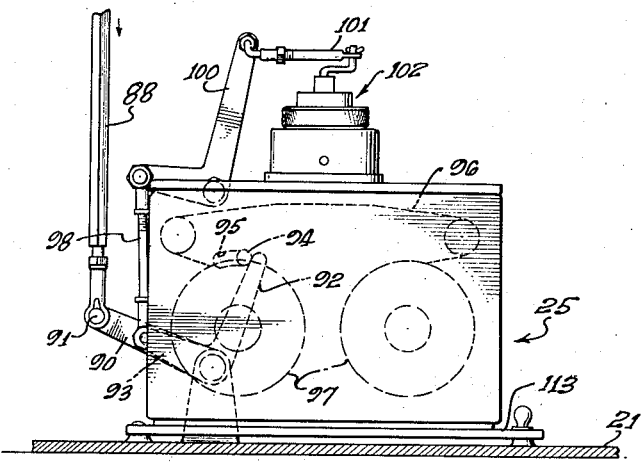
Fig. 8 is a side elevational view of the camera unit and portions of the actuating linkage therefor, as taken substantially as indicated by line 8—8, Fig. 1.
Figure 9:
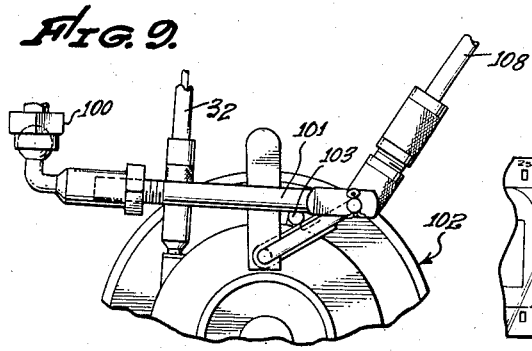
Fig. 9 is a top plan view of a portion of the camera shutter mechanism and associated linkage.

With reference to the drawings, the device of the present invention is enclosed within a generally rectangularly shaped cabinet 20, having a bottom wall portion 21 and a top wall cover portion 22, together with an access door or the like 23 at the rear side thereof.

In general, the device includes a combination handrest and document holder assembly 24, a camera unit 25, a stroboscopically operated illumination unit 26, and a power pack 27. Additionally, the device includes a manually operated shutter reset member 28, disposed beyond the exterior of the cabinet 20 through an opening 30, and camera release control button 31, extending outwardly through the cover 22 and connecting with the shutter of the camera unit 25 as by a flexible control cable 32. The button 31 and upper portion of the control cable 32 are supported with respect to the cover 22 as by a bracket 33.

As shown especially in Figs. 2 and 3, the combination handrest and document holder assembly 24 comprises a generally L-shaped base portion 34 that is provided, adjacent the bend therein, with hinge members 35 that are adapted for cooperation with bosses 36, disposed upwardly from the cover 22, to provide a hinge for the base member 34 through use of pins 37. The combination handrest and document holder assembly 24 is adapted for pivotal disposition in an opening 38 in the cover 22. The sides of the opening 38 are defined by inwardly extending flanges 40, while a branch opening 41, communicating with the opening 38, is defined by an inwardly directed flange 42. The openings 38 and 41 combine to form a generally T-shaped opening, there being an inclined flange 43 on one side of the opening 38 adjacent the branch opening 41. One leg 44, of the base member 34, is adapted for cooperation with the angularly disposed flange 43, thereby to limit inward pivotal movement of the base 34 about the pins 37.

As shown primarily in Figs. 3 and 5, a document backing or support plate 45, which may be made from a black plastic or the like, is angularly disposed intermediate the free ends of the legs of the L-shaped base member 34 and is secured thereto as by screws 46. A transparent cover member 47 is removably disposed over the document backing plate 45. A pair of brackets 48 are secured to the lateral sides of the transparent cover member 47, as by rivets 50 or the like, with a portion of the brackets being disposed adjacent lateral sides of the base member 34 to provide hinge members. The brackets 48 are pivotally attached to the base member as by screws 51. As shown primarily in Fig. 4, a longitudinal edge of the cover member 47, adjacent the hinge point thereof, is rounded as at 52 and provided with a plurality of cutaway portions 53 so that the cover member may clear a plurality of document stop pins 54 that are disposed in spaced relationship in the base member along a line adjacent the hinged edge of the cover member. The transparent cover member 47 is retained in position adjacent the backing member 45 as by a pivotal catch member 55 that is mounted on a pin 56. The catch member 55 is spring biased relative to the pin 56 so that a document, indicated generally at 57, may be of any desired thickness and still be retained in tight contact between the cover member 47 and backing plate 45.

In order to load a document, such as the check 57, in the document holding assembly 24, the assembly is rotated, as shown in Fig. 3, to the dotted line position, the catch 55 is released and the transparent cover member 47 is moved to the dotted line position. A pair of bumper members 58 are secured to one side of the base member 34 and are adapted to contact the upper surface of the cabinet cover 22 when the document holder 24 is moved to the dotted line position. The document may thereafter be placed in position on the backing plate 45 and the cover member 47 moved to a closed position and latched at such position as by the latch 55. The entire assembly 34 may thereafter be rotated to the solid line position shown in Fig. 3, with the leg 44 of the base member 34 resting against the angularly disposed flange 43 so as to maintain the document holder 24 in this position with the document 57 being presented toward the interior of the cabinet 20.

For a purpose to be hereinafter more fully described, a generally rectangular boss 60 is formed in the generally central area of the leg 44 of the base member 34, this boss protruding outwardly from the leg 44 and slightly upwardly above the upper surface of the base member 34, when the document holder 24 is in a downward position, as shown in the solid lines in Fig. 3.

When placing a check or other document in the combination handrest and document holder 24, in the manner hereinbefore described, the document may be folded so that any endorsements on the back thereof may be photographed simultaneously with the face of the check if desired. In most cases, only one or two endorsements will be present, so that exposing them by folding of the check will not interfere with the photographing of the main portion of the face of the check. If, however, there are a plurality of endorsements, it may be necessary to make two photographs, one of the entire back, and the other of the entire face of the document, together with the photographs of the distal portions of the fingers and the thumbs of the individual presenting the instrument.

Figure 6:
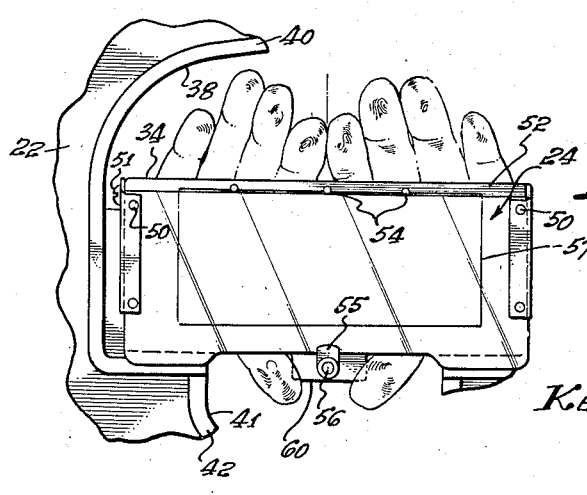
Fig. 6 is a view similar to Fig. 5, showing the relationship of the instrument-holding means to the hands of an individual.

For the purpose of simultaneously photographing both the fingers and thumbs and the instrument, the combination handrest and document holder 24 is disposed in substantially spaced relationship to oppositely disposed sides of both the opening 38 and the branch opening 41. The centrally disposed boss 60 serves to maintain the fingers and thumbs of the hands in spaced relationship. The base member is so arranged, dimensioned and positioned with respect to the openings 38 and 41, so that both thumbs may be pointed downwardly adjacent the boss 60 on one side of the handrest and document holder and adjacent the location of the individual whose fingerprints are being photographed. The distal portions of fingers of the individual will then project forwardly in a direction away from the thumbs, over the opposite side of the base member 34 and in substantially the same plane as the document 57. The document will then be disposed between the fingers and thumbs in position to be photographed readily from within the cabinet. The fingerprints of the distal portions of the thumbs and fingers face the camera 25, as shown in Fig. 6.

The holder 24 is so designed and inclined that the distal portions of the thumbs and fingers lie in substantially the same horizontal plane as the check, so that they all lie in about the front focal plane of the camera. In this way optimum focus and maximum definition is obtained. The importance of this will be realized when it is recalled by way of example, that when the distance from the lens to the front focal plane is about 16 inches the depth of field of an $f/16$ lens may be only about 8 inches. Such optimum focal arrangement may be attained by employing a holder as shown, having a base member 34 and a leg 44 that are arranged at 90° relative to each other, and employing a backing member 45 that forms an angle of about 14° relative to the base member. By arranging the flange 43 at an angle of 24° relative to the vertical, the plane of the check is inclined at an angle of about 10° relative to the horizontal plane. In this way, the distal portions of the thumbs and fingers, as well as the check, lie in a common focal plane on the optic axis of the camera 25 and good photographic images of all can be obtained.

Figure 10:
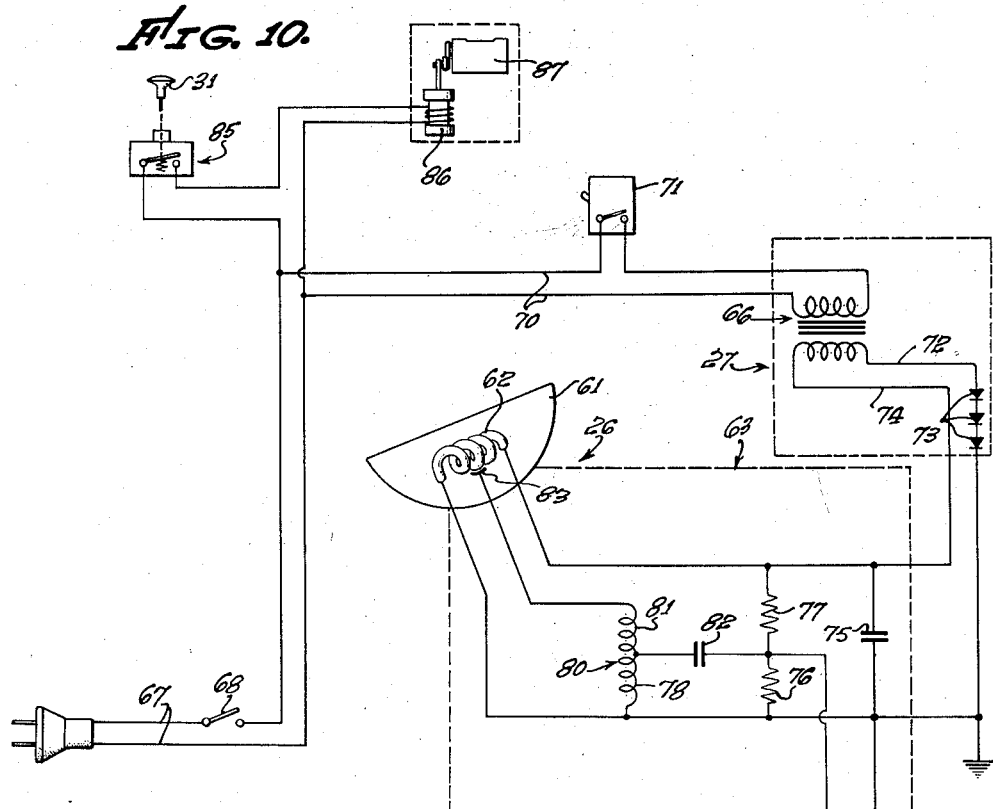
Fig. 10 is a schematic wiring diagram, and a portion of the shutter controlling mechanism shown in cocked position.
Figure 11:
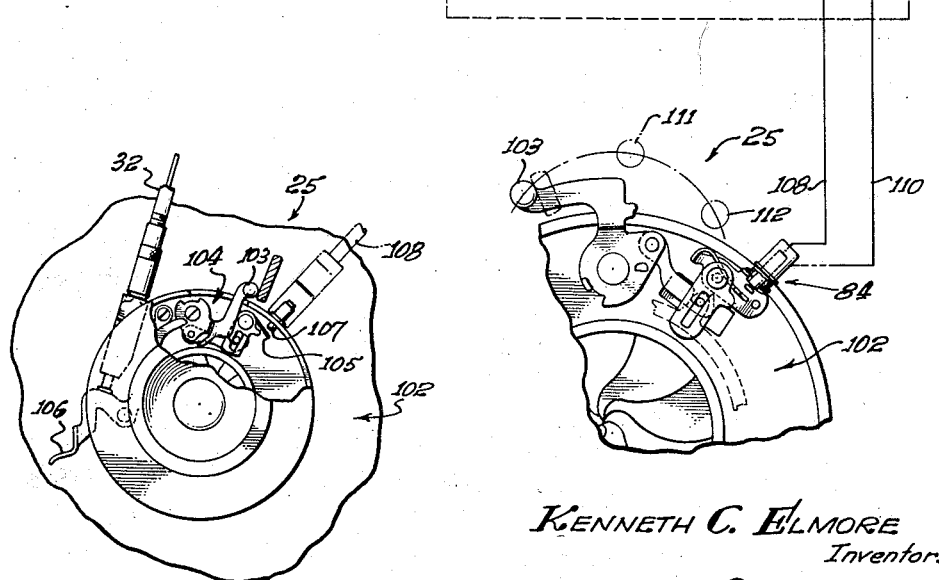
Fig. 11 is a fragmentary view, partly broken away to show details of the shutter operated switch mechanism.

Illumination of the check or other document carried by the combination handrest and document holder 24, and proper illumination of the document and the digits of the individual presenting the document, is accomplished through use of the illumination unit 26, which consists of a reflector 61, a high intensity flash lamp 62 and a power pack 63, as shown in Figs. 1 and 10. The illumination unit 26 is mounted within the lower portion of the cabinet 20, as by a bracket 64, and suitable rivets or the like 65. The illumination unit 26 is mounted with its central or optic axis directed at an angle of about 16° to the center of the holder 24, so as to transmit light to the document and fingers being photographed without excessive reflection of the light from the side walls back to the lens of the camera 25. Furthermore, the lamp 62 is arranged on the side of the camera 25 toward which the holder 24 is inclined and the backing plate 45 and transparent cover member 47 are tilted so that specular reflection of light to the camera from the face of the holder 24 is avoided. By so positioning and arranging the illumination unit, glare is eliminated and the illumination unit 26 may be positioned close to the camera. Thus, from Fig. 1, it may be seen that the direct rays from the lamp 62 are reflected by the transparent cover member 57 toward the outer walls of the cabinet, and other interior surfaces thereof, rather than directly toward the lens of the camera. The reflected light within the cabinet assists in producing diffuse illumination for the curved surfaces of the fingers and thumbs, thereby clearly defining the fingerprint configurations thereon. The interior of the cabinet may be painted or otherwise treated to produce a light diffusing surface, or in some cases, may be blackened to absorb light, the results in either case being to minimize the effect of glare.

Details of the power unit 63 and the power pack 27 are shown schematically in the wiring diagram of Fig. 10. As shown, alternating current is applied to a transformer 66, contained in the power pack 27, through suitable leads 67 connected to a conventional A. C. source. A master switch 68 connected in one of the leads 67 serves to energize and de-energize the circuit. Electrical power is delivered to the transformer 66 by branch leads 70 in which a toggle switch 71 is positioned. From the transformer 66 one lead 72 extends through a series of rectifier units 73 and to ground, while a second lead 74 extends to the high voltage side of the power unit 26. The transformer 66 and rectifiers 73 remain energized continuously while the present device is in operation so that electrical energy is always available for charging a shunt capacitor 75 connected across the leads 72 and 74 at the input of the power unit 26. The capacitor 75 is bridged as by a voltage divider consisting of a pair of series-connected resistors 76 and 77. The potential across the resistor 76 is applied to a primary winding 78 of an auto-transformer 80 which has a high voltage secondary winding 81. The connection with the primary 78 is made through a capacitance 82 so that the time constant for firing the circuit will be short in comparison to that of the time required for charging the capacitor 75 and capacitor 82.

The input potential through leads 72 and 74 is also applied terminally to the flash lamp 62, but since it requires a voltage of about 2000 volts across the terminals to fire the lamp, the lamp remains dark. A firing or igniter electrode 83 is disposed midway between the terminals of the lamp at a point where a potential of about 1000 volts will fire it, and this electrode is connected to the high voltage end of the transformer secondary 81. Firing of the lamp is accomplished by shorting out the resistor 76, causing condenser 82 to discharge rapidly through the primary winding 78. The resultant rapid flux change in the transformer 80 develops a high potential in excess of 1000 volts across the secondary winding 81, initiating a discharge through the lamp. This shorting is accomplished by means of a switch 84 disposed in and forming a portion of the shutter mechanism of the camera 25. As explained more fully hereinafter, resistor 76 is shorted, firing the lamp 62 each time the camera 25 is operated to take a photograph.

The high intensity lamp 62 together with the circuit utilized in connection therewith to fire the lamp and the power pack for delivering direct current to the power unit, are of conventional design and the details thereof per se form no part of the present invention, except in combination with other parts. However, the detailed structure has been shown in order to present adequate information for a complete understanding of the present invention.

In operation, each time the push button 31 is depressed, a micro-switch 85, disposed adjacent thereto, is closed, thus energizing a solenoid 86 and actuating a suitable counter 87. The counter 87 is visible through a window 88 arranged in the top 22 of the cabinet 20. Operating current for the counter 87 is supplied through suitable leads connected with the leads 67.

In order to prepare the camera 25 and shutter associated therewith for operation by the button 31, the outside lever 28 is pushed downwardly, thereby moving a rod 88 downwardly to rotate a bell crank arm 90 connected to the lower end of the rod 88 as by a rivet 91. As shown in Figs. 1 and 8, the bell crank arm 90 has connected thereto, a film advance bell crank 92 and a shutter control bell crank 93. The film advance bell crank 92 operates in conjunction with a pin 94 movable in a slot 95 and connected therethrough to conventional film advancing mechanisms within the camera 25. The advancing mechanism is of the ratchet type so that successive movements of the film advance bell crank 92 cause successive advances of the film strip 96 arranged in the camera 25 on suitable conventional reels 97.

The shutter control bell crank 93 is linked by means of a rod 98, a second bell crank 100 and a linkage 101 to the shutter actuating mechanism indicated generally at 102. Operation of the linkage 101 and associated structure cocks the shutter through a cocking lever 103 associated therewith. As indicated in Fig. 1, the lever 103 controls, through conventional associated linkages indicated generally at 104 within the camera shutter mechanism, the positioning of a switch contact arm 105. At the time of cocking, switch arm 105 is withdrawn from the stationary contact 107, causing a voltage to develop across resistor 76 and to charge condenser 82 through primary winding 78. The condenser 82 charges more slowly than it discharges due to the action of the resistor 76. Furthermore, the voltage developed across the secondary winding 81 is in a direction opposite to the voltage across the terminals of the lamp 62. For these reasons the lamp 62 is not fired during the condenser charging operation. Furthermore, the condenser 82 charges rapidly, that is, in about a second, so that the illumination unit 26 is ready for operation as soon as the camera shutter has been cocked. After the camera 25 and illumination unit 26 are ready for operation, depression of the switch button 31 forces the Bowden wire 32 downwardly, actuating the shutter tripping lever 106, thereby operating the shutter. The linkages 104 simultaneously operate with the actuation of the shutter to close the switch arm 105 against a stationary contact 107 connected by means of a lead 108 to the high potential side of the resistor 76. The frame of the shutter and switch arm 105 are connected by means of a lead 110 to the grounded side of the resistor 76, thus completing the circuit to short this resistor and firing the lamp 62.

In Fig. 10, the several positions of the cocking lever 103 have been indicated as by suitable legends. The lever 103 is shown as fully cocked in the solid lines, at the end of the opening cycle in dotted lines at 111, and at the end of the closing cycle in dotted lines at 112. When the cocking lever 103 has moved to the position shown at 111, the end of the opening cycle, the switch contact 105 snaps into engagement with the stationary switch contact 107. These contacts remain in a closed position during the discharge through the lamp 62 and until the cocking lever reaches the position as shown at 112 for the end of the closing cycle. The cocking lever 103 then returns to its initial position. The movements required to open the iris and close the switch are indicated by suitable legends in the figure. The shutter, switch, actuating mechanism for the devices, the lens and the iris are of conventional form utilized with cameras of the type employing such mechanism and per se form no specific part of the present invention except in combination with other parts.

Figure 7:
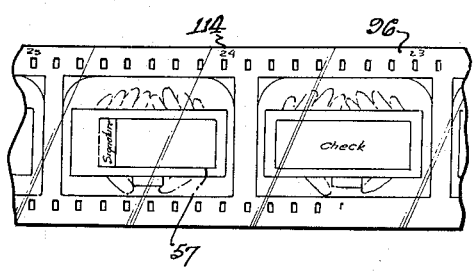
Fig. 7 is a representation of a strip of film showing a series of exposures thereon.

As shown primarily in Figs. 1 and 8, the camera 25 is mounted as by a suitable means, such as, for example, a mounting bracket 113, to the bottom panel 21 of the cabinet 20. The field of view of the camera is such as to take in a portion of the openings 38 and 41, the surface of the combination handrest and document holder 24, and the distal ends of the two thumbs and fingers of both hands of the individual presenting the document. Successive exposures on the film 96 are shown in Fig. 7. The various numbers on the film, as indicated at 114, may be made to correspond with the numbering established by the counter 87 so as accurately to maintain a record of use of the film and indicate the amount of film remaining in the camera 25.

It will thus be apparent that the present invention provides a device in which the identity of a check, negotiable instrument or other document and the fingerprints of the individual presenting such document for consideration, may be simultaneously recorded in a permanent form making certain that the individual who presents such a document without being entitled to do so, shall be identified. The information thus obtained will act to discourage forgery, will reduce losses to the users thereof, and will permit lower costs to the customers of the users.

In this application it will be noted that the term "fingerprints" has been employed to indicate an image of the inner sides of the distal ends of the thumbs and fingers, even though the images are formed by a lens rather than by pressing the thumbs and fingers onto a record strip, or the like.

Having thus described the invention and the present embodiment thereof, it will now be obvious that the invention may be embodied in many other forms within the scope of the appended claims.

The invention claimed is:

1. A photographic device comprising, in combination: a cabinet; a combination hand support and document holder pivotally disposed in an upper portion of said cabinet; means accessible by pivotal movement of said holder for removably disposing said document in said holder, said holder being thereafter pivotally movable for presentation of said document toward the interior of said cabinet; an opening surrounding said holder, whereby two hands may be rested on said holder, exposing all the fingers and the thumbs through said opening substantially in the plane of the document held within said combination hand support and document holder; a camera disposed in the lower portion of said cabinet; illumination means associated with said camera and operable by actuation of a shutter on said camera; remote control means for actuating said shutter; and means operable from the exterior of said cabinet for simultaneously resetting said camera, said shutter, and said illumination means for a subsequent exposure.

2. In a device for reducing the fraudulent cashing of checks: a cabinet; a camera disposed within said cabinet; a combination hand rest and check holder disposed on said device, said combination hand rest and check holder comprising a hand engaging member adapted to receive the hands of an individual presenting a check for cashing, with the thumbs pointing downwardly on one side thereof and the distal portions of the finger tips extending downwardly on the opposite side thereof, said hand engaging member being pivotally arranged on the top of said cabinet so that it may be swung upwardly and outwardly; a second hinged member secured thereto, said second member being normally arranged to be visible from said camera and being so arranged that when pivotally swung upwardly and outwardly from said cabinet it may be pivoted away from said hand engaging member to permit the extraction of a prior check and the insertion of a check to be photographed, said second member being transparent to permit photographing said check therethrough, and having means adapted to maintain the position of a check therewithin substantially flat; and an illumination unit disposed within said cabinet for illuminating the fingers, the thumbs and the check.

3. A photographic device comprising in combination: a cabinet having means defining a field of view in the top side thereof, a camera disposed in said cabinet in a position to photograph an object in said field of view, a combination hand support and document holder having a lower side and an upper side, said holder comprising means for mounting a document to be photographed on the lower side of said holder, means for movably supporting said holder in said field of view to permit exposure of the lower side of said holder to a position outside said cabinet to facilitate mounting a document on said lower side of said holder and to permit movement of said holder to a position in which said document is firmly supported in said field of view on the lower side of said holder, said holder also comprising a hand-engaging member on the upper side of said holder, said member being adapted to receive a hand of an individual presenting the document with the palm of the hand firmly supported over said holder with the distal portions of the fingers extending beyond the edge of said holder and in substantially the plane of the document held by said holder with both the document and said distal portions of said fingers within the said field of view, and means for operating said camera for photographing said document and said distal portions of said fingers simultaneously.

4. A photographic device comprising in combination: a cabinet having an opening in the top side thereof, a camera disposed in the lower portion of said cabinet in a position to photograph an object in said opening, a combination hand support and document holder having a lower side and an upper side, said holder comprising means for mounting a document to be photographed on the lower side of said holder, means for movably supporting said holder in said opening to permit exposure of the lower side thereof to a position outside said cabinet to facilitate mounting a document on said lower side of said holder and to permit mounting of said holder in said opening with said document on the lower side thereof, said holder also comprising a hand-engaging member on the upper side of said holder, said member being adapted to receive a hand of an individual presenting the document with the palm of the hand over said holder and with the distal portions of the fingers extending beond one edge of the holder on one side thereof into said opening and with the thumb of the hand extending beyond the edge of said holder on the other side thereof into said opening with the fingers and thumb substantially in the plane of the document held by the holder, said thumb, fingers, and document being within the field of view of said camera, and means for operating said camera for photographing said document and said distal portions of said fingers simultaneously.

References Cited in the file of this patent.

UNITED STATES PATENTS

| | | |
|---|---|---|
| 2,530,758 | Cirone | Nov. 21, 1950 |
| 2,565,088 | Pratt | Aug. 21, 1951 |
| 2,579,961 | Popma | Dec. 25, 1951 |
| 2,657,612 | Wightman | Nov. 3, 1953 |
| 2,730,936 | Fagan | Jan. 17, 1956 |